(12) United States Patent  
Shigetomi et al.

(10) Patent No.: US 10,738,221 B2  
(45) Date of Patent: Aug. 11, 2020

(54) PRESSSURE-SENSITIVE ADHESIVE SHEET

(71) Applicant: NITTO DENKO CORPORATION, Ibaraki-shi, Osaka (JP)

(72) Inventors: Kiyoe Shigetomi, Ibaraki (JP); Ryo Kanno, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/371,416

(22) Filed: Dec. 7, 2016

(65) Prior Publication Data

US 2017/0081557 A1 Mar. 23, 2017

Related U.S. Application Data

(63) Continuation of application No. PCT/JP2015/066500, filed on Jun. 8, 2015.

(30) Foreign Application Priority Data

Jun. 11, 2014 (JP) .................. 2014-120461

(51) Int. Cl.
  *C09J 7/38* (2018.01)
  *C09J 133/08* (2006.01)
  (Continued)

(52) U.S. Cl.
  CPC ............. *C09J 7/385* (2018.01); *C08K 5/0025* (2013.01); *C09J 7/22* (2018.01); *C09J 133/08* (2013.01);
  (Continued)

(58) Field of Classification Search
  None
  See application file for complete search history.

(56) References Cited

U.S. PATENT DOCUMENTS 4,693,935 A * 9/1987 Mazurek ............. C08F 290/068
  428/352
5,814,685 A * 9/1998 Satake ................. C09D 11/326
  347/100
(Continued)

FOREIGN PATENT DOCUMENTS

CN  85 1 07413 A  4/1987
CN  101652447 A  2/2010
(Continued)

OTHER PUBLICATIONS

Aldrich Data Sheet (Year: 2018).*
(Continued)

*Primary Examiner* — Frank D Ducheneaux
(74) *Attorney, Agent, or Firm* — Sughrue Mion, PLLC

(57) ABSTRACT

A pressure-sensitive adhesive sheet has a substrate and a pressure-sensitive adhesive layer laminated on at least one side of the substrate. The pressure-sensitive adhesive layer contains a (meth)acrylic polymer having a weight average molecular weight of 10000 or more but less than 50000. Pressure-sensitive adhesive force, occurring after 30 minutes since the pressure-sensitive adhesive layer was attached to an ABS plate, is 1.0 [N/20 mm] or less, pressure-sensitive adhesive force, occurring after 24 hours since the pressure-sensitive adhesive layer was attached to an ABS plate, is 2.5 [N/20 mm] or less, and pressure-sensitive adhesive force, occurring after 30 minutes at 23° C. since the pressure-sensitive adhesive layer was attached to an ABS plate and then heated at 80° C. for 5 minutes, is 6.5 [N/20 mm] or more.

14 Claims, 1 Drawing Sheet

(51) Int. Cl.
  *C09J 7/22*   (2018.01)
  *C09J 183/04*  (2006.01)
  *C08K 5/00*   (2006.01)
(52) U.S. Cl.
  CPC ....... *C09J 183/04* (2013.01); *C09J 2201/606* (2013.01); *C09J 2201/622* (2013.01); *C09J 2433/00* (2013.01); *C09J 2483/00* (2013.01)

(56) References Cited

U.S. PATENT DOCUMENTS

| | | | |
|---|---|---|---|
| 6,893,583 B2* | 5/2005 | Sakurai | C08F 2/44 252/182.13 |
| 2007/0036953 A1 | 2/2007 | Nonaka et al. | |
| 2007/0213463 A1* | 9/2007 | Sherman | C08F 265/04 525/100 |
| 2010/0101723 A1 | 4/2010 | Okamoto et al. | |
| 2010/0233467 A1* | 9/2010 | Niwa | C09J 4/00 428/323 |
| 2012/0121824 A1 | 5/2012 | Toyama et al. | |
| 2012/0145305 A1 | 6/2012 | Matsumoto et al. | |
| 2012/0202076 A1† | 8/2012 | Ehara | |
| 2012/0214936 A1 | 8/2012 | Fujita et al. | |
| 2014/0154450 A1 | 6/2014 | Yutou et al. | |
| 2016/0032154 A1 | 2/2016 | Kanno et al. | |
| 2017/0043566 A1 | 2/2017 | Kanno et al. | |

FOREIGN PATENT DOCUMENTS

| | | |
|---|---|---|
| CN | 102076802 A | 5/2011 |
| CN | 102816536 A | 12/2012 |
| JP | 11-302610 A | 11/1999 |
| JP | 11-302614 A | 11/1999 |
| JP | 2003-238923 A | 8/2003 |
| JP | 2005-213341 A | 8/2005 |
| JP | 2007-45974 A | 2/2007 |
| JP | 2009-067824 A2 † | 4/2009 |
| JP | 2010-202863 A | 9/2010 |
| JP | 2011-127054 A | 6/2011 |
| JP | 2011-184603 A2 † | 9/2011 |
| JP | 2012-177084 A | 9/2012 |
| JP | 2012-184369 A | 9/2012 |
| JP | 2014-037502 A | 2/2014 |
| JP | 5430722 B2 † | 6/2014 |
| JP | 2014-224227 A | 12/2014 |
| JP | 2016-037578 A | 3/2016 |
| JP | 5890596 B1 | 3/2016 |
| JP | 2016-079232 A | 5/2016 |
| KR | 10-2012-0058524 A | 6/2012 |
| KR | 10-2012-0094869 A | 8/2012 |
| KR | 10-2016-0127839 A | 11/2016 |
| WO | 2015/163115 A1 | 10/2015 |
| WO | 2016/021332 A1 | 2/2016 |

OTHER PUBLICATIONS

International Search Report for PCT/JP2015/066500, dated Sep. 8, 2015.
Notification of First Office Action dated Jun. 15, 2017 from the State Intellectual Property Office of the P.R.C. in counterpart application No. 201580030887.1.
First Notification of Reasons for Refusal dated Jan. 14, 2019, issued by the China National Intellectual Property Administration (CNIPA) in Chinese Application No. 201780005037.5, which corresponds to U.S. Appl. No. 15/771,636.
Invitation to Respond to Written Opinion dated May 16, 2018 from the Singapore Patent Office in Singapore application No. 11201801772R, which corresponds to U.S. Appl. No. 15/771,636.
Notice of Final Rejection dated Aug. 23, 2019, from the Korean Intellectual Property Office in application No. 10-2018-7008596, which corresponds to U.S. Appl. No. 15/771,636.
Notification of Reasons for Refusal dated Apr. 26, 2018 from the Japanese Patent Office in Japanese application No. 2018-507036, which corresponds to U.S. Appl. No. 15/771,636.
Notification of Reasons for Refusal dated Dec. 27, 2018, from Korean Intellectual Property Office in application No. 10-2018-7008596, which corresponds to U.S. Appl. No. 15/771,636.
Notification of Reasons for Rejection dated Jul. 30, 2018, issued by the Korean Intellectual Property Office in Korean Application No. 10-2018-7008596, which corresponds to U.S. Appl. No. 15/771,636.
Second Office Action dated Aug. 13, 2019, from the State Intellectual Property Office of the P.R.C in application No. 201780005037.5, which corresponds to U.S. Appl. No. 15/771,636.
Non-Final Office Action dated Jan. 8, 2020, from the United States Patent and Trademark Office in U.S. Appl. No. 15/771,636, which corresponds to U.S. Appl. No. 15/771,636.
Notification of Reasons for Refusal dated Apr. 5, 2018, from the Japanese Patent Office in application No. 2018-500754, which corresponds to U.S. Appl. No. 15/776,896.
Notification of Reasons for Refusal dated Dec. 27, 2018, from Korean Intellectual Property Office in application No. 10-2018-7003876, which corresponds to U.S. Appl. No. 15/776,896.
Notification of Reasons for Rejection dated Jul. 30, 2018 from the Korean Intellectual Property Office in application No. 10-2018-7003876, which corresponds to U.S. Appl. No. 15/776,896.
Invitation to Respond to Written Opinion dated May 21, 2018, from the Intellectual Property Office of Singapore in application No. 11201801407W, which corresponds to U.S. Appl. No. 15/776,896.
Non-Final Office Action dated Jan. 9, 2020, from the United States Patent and Trademark Office in U.S. Appl. No. 15/766,896, which corresponds to U.S. Appl. No. 15/776,896.

* cited by examiner
† cited by third party

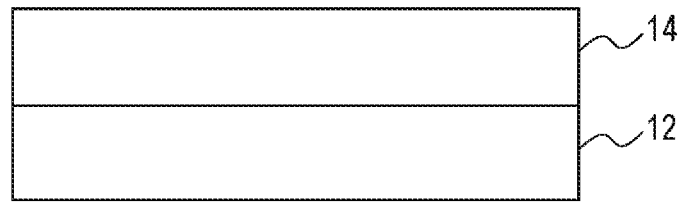

PRESSSURE-SENSITIVE ADHESIVE SHEET

CROSS-REFERENCE TO RELATED APPLICATIONS

This application is based upon and claims the benefit of priority from the prior Japanese Patent Application No. 2014-120461, filed on Jun. 11, 2014, and International Patent Application No. PCT/JP 2015/066500, filed on Jun. 8, 2015, the entire content of each of which is incorporated herein by reference.

BACKGROUND OF THE INVENTION

1. Field of the Invention

The present invention relates to a pressure-sensitive adhesive sheet.

2. Description of the Related Art

A pressure-sensitive adhesive sheet is used for adhering adherends to each other or for fixing an article to an adherend by being firmly adhered to the adherend. The properties required of the pressure-sensitive adhesive sheet are various depending on applications, and for example, in order to prevent a decrease in yield caused by an attachment mistake, there is a need for a pressure-sensitive adhesive sheet in which reattachment (reworkability) is taken into consideration. That is, there is a need for a pressure-sensitive adhesive sheet that exhibits low pressure-sensitive adhesive force at the beginning of attachment and high pressure-sensitive adhesive force when an adherend is used.

In order to meet such a change in pressure-sensitive adhesive force, methods for changing the pressure-sensitive adhesive force of pressure-sensitive adhesive sheets by heating or ultraviolet radiation have traditionally been used (see Patent Documents 1 to 4).

[PATENT DOCUMENT 1] Japanese Patent Application Publication No. Hei 11-302610
[PATENT DOCUMENT 2] Japanese Patent Application Publication No. Hei 11-302614
[PATENT DOCUMENT 3] Japanese Patent Application Publication No. 2011-127054
[PATENT DOCUMENT 4] Japanese Patent Application Publication No. 2007-045974

Even with the same pressure-sensitive adhesive sheet, pressure-sensitive adhesive properties may be different when the material of an adherend is different. Additionally, reattachment may be required immediately after a pressure-sensitive adhesive sheet is attached to an adherend, or reattachment may be required after some time has passed since it was attached, depending on the application of the sheet.

However, the pressure-sensitive adhesive sheet described in each of Patent Documents 1 to 4 increases pressure-sensitive adhesive force over time, although exhibits low pressure-sensitive adhesive force at the beginning of attachment. Accordingly, when the elapsed time between the attachment of a pressure-sensitive adhesive sheet to an adherend and the reattachment of the sheet is long, there is room for an improvement in reworkability.

SUMMARY OF THE INVENTION

The present invention has been made in view of these situations, and a purpose of the invention is to provide a pressure-sensitive adhesive sheet in which rework to an adherend can be performed over a long period of time and the pressure-sensitive adhesive force required for fixing the adherend can be exhibited at a desired timing.

In order to solve t e above problem, a pressure-sensitive adhesive sheet according to an embodiment of the present invention has a substrate and a pressure-sensitive adhesive layer laminated on at least one side of the substrate. The pressure-sensitive adhesive layer contains a (met)acrylic polymer having a weight average molecular weight of 10000 or more but less than 50000. Pressure-sensitive adhesive force, occurring after 30 minutes since the pressure-sensitive adhesive layer was attached to an ABS plate, is 1.0 [N/20 mm] or less, pressure-sensitive adhesive force, occurring after 24 hours since the pressure-sensitive adhesive layer was attached to an ABS plate, is 2.5 [N/20 mm] or less, and pressure-sensitive adhesive force, occurring after 30 minutes at 23° C. since the pressure-sensitive adhesive layer was attached to an ABS plate and then heated at 80° C. for 5 minutes, is 6.5 [N/20 mm] or more.

BRIEF DESCRIPTION OF THE DRAWINGS

Embodiments will now be described by way of examples only, with reference to the accompanying drawings which are meant to be exemplary, not limiting and wherein like elements are numbered alike in several FIGURES in which:

FIG. 1 is a side view of a pressure-sensitive adhesive sheet according to the present embodiment.

DETAILED DESCRIPTION OF THE INVENTION

In order to solve the above problem, a pressure-sensitive adhesive sheet according to an aspect of the present embodiment has a substrate and a pressure-sensitive adhesive layer laminated on at least one side of the substrate. The pressure-sensitive adhesive layer contains a (meth)acrylic polymer having a weight average molecular weight of 10000 or more but less than 50000. Pressure-sensitive adhesive force, occurring after 30 minutes since the pressure-sensitive adhesive layer was attached to an ABS plate, is 1.0 [N/20 mm] or less, pressure-sensitive adhesive force, occurring after 24 hours since the pressure-sensitive adhesive layer was attached to an ABS plate, is 2.5 [N/20 mm] or less, and pressure-sensitive adhesive force, occurring after 30 minutes at 23° C. since the pressure-sensitive adhesive layer was attached to an ABS plate and then heated at 80° C. for 5 minutes, is 6.5 [N/20 mm] or more.

The (meth)acrylic polymer may contain, as a monomer unit, a monomer having a polyorganosiloxane backbone.

The monomer having a polyorganosiloxane backbone may be a polyorganosiloxane group-containing monomer having a functional group equivalent weight of 700 g/mol or more but less than 15000 g/mol, the monomer being represented by the following general formula (1) or (2)

[Chemical Formula 1]

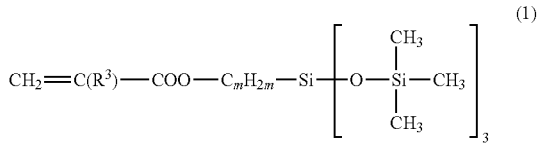

-continued

[Chemical Formula 2]

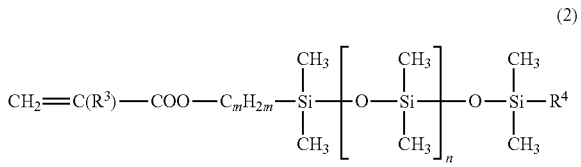

(2)

[in the formulae (1) and (2), $R^3$ is hydrogen or methyl, $R^4$ is methyl or a monovalent organic group, and m and n are integers of 0 or larger.]

The pressure-sensitive adhesive layer may contain 100 parts by mass of a polymer having a glass transition temperature lower than 0° C. and 0.1 to 20 parts by mass of a (meth)acrylic polymer.

Appropriate combinations of the above respective elements will also be within the scope of the present invention sought to be protected by the patent application.

According to the present embodiment, a pressure-sensitive adhesive sheet can be achieved in which rework to an adherend can be performed over a long period of time and the pressure-sensitive adhesive force required for fixing the adherend can be exhibited at a desired timing.

A pressure-sensitive adhesive composition according to an embodiment contains a polymer (A) and a (meth)acrylic polymer (B).

Hereinafter, each component that forms the pressure-sensitive adhesive composition according to an embodiment will be described in detail.

[Polymer (A)]

The polymer (A) is one having a glass transition temperature lower than 0° C. The polymer (A) is not particularly limited as far as the glass transition temperature of which is lower than 0° C., and various polymers to be generally used as a pressure-sensitive adhesive, such as an acrylic polymer, rubber polymer, silicone polymer, polyurethane polymer, and polyester polymer, can be used. In particular, when the polymer (B) is a (meth)acrylic polymer, an acrylic polymer, which is easily compatible with a (meth)acrylic polymer and has high transparency, is preferable.

The glass transition temperature (Tg) of the polymer (A) is lower than 0° C., preferably lower than −10° C., and more preferably lower than −40° C., but usually −80° C. or higher. When the glass transition temperature (Tg) of the polymer (A) is 0° C. or higher, the polymer is less likely to flow, and an increase in pressure-sensitive adhesive force, occurring when being heated, may be deteriorated.

The glass transition temperature is a nominal value described in documents or catalogs, etc., or a value calculated based on the following equation (X) (Fox Equation).

$$1/Tg = W1/Tg1 + W2/Tg2 + \ldots + Wn/Tgn \quad (X)$$

[In the equation (X), Tg represents the glass transition temperature (unit: K) of the polymer (A) Tgi (i=1, 2, . . . , n) represents a glass transition temperature (unit: K) occurring when a monomer i forms a homopolymer, and Wi (i=1, 2, . . . , n) represents the mass fraction of the monomer i in the total monomer components.] The above equation (X) is adopted when the polymer (A) is formed of n types of monomer components of monomer 1, monomer 2, . . . , monomer n.

In the present description, the "glass transition temperature occurring when forming a homopolymer" means the "glass transition temperature of a homopolymer of the monomer", which means the glass transition temperature (Tg) of a polymer formed only by a monomer (sometimes referred to as a "monomer X") as a monomer component. Specifically, those values are described in "Polymer Handbook" (Third Edition, John Wiley & Sons, Inc, 1989). The glass transition temperatures (Ig) of homopolymers, which are not described in the above document, mean the values obtained, for example, by the following measuring method. That is, into a reactor provided with a thermometer, a stirrer, a nitrogen inlet pipe, and a reflux cooling pipe, 100 parts by mass of the monomer X, 0.2 parts by mass of 2,2′-azobisisobutyronitrile, and 200 parts by mass of ethyl acetate as a polymerization solvent are placed, and the mixture is stirred for 1 hour while nitrogen gas is being introduced. After the oxygen in the polymerization system is removed in this way, the mixture is heated to 63° C. to react with each other for 10 hours. Subsequently, the mixture is cooled to room temperature to obtain a homopolymer solution having a solid concentration of 33% by mass. Subsequently, this homopolymer solution is caused to flow on a release liner to be coated thereon, and the solution is then dried to make a test sample (sheet-shaped homopolymer) having a thickness of approximately 2 mm. Subsequently, approximately 1 to 2 mg of this test sample is weighed and placed in an aluminum open cell, so that Reversing Heat Flow (specific heat component) behaviors of the homopolymer are obtained by using a temperature-modulated DSC (product name: "Q-2000" made by TA Instruments, Inc.) at a heating rate of 5° C./min under 50 ml/min of a nitrogen flow rate atmosphere. With reference to JIS-K-7121, the temperature at the point where a straight line, located at the same distance in the vertical axis direction from a straight line obtained by extending the base line on the low-temperature side of the obtained Reversing Heat Flow so and from a straight line obtained by extending the base line on the high-temperature side thereof, and a curved line, located at the portion where the glass transition temperature is changed in a stepwise shape, intersect with each other is determined to be the glass transition temperature (Tg) of the homopolymer.

The weight average molecular weight (Mw) of the polymer (A) is, for example, approximately 50,000 to 5,000,000. If the weight average molecular weight (Mw) is less than 50,000, the cohesive force of a pressure-sensitive adhesive becomes insufficient, and hence adhesion reliability may be deteriorated. Conversely, if the weight average molecular weight (Mw) is more than 5,000,000, the flowability of a pressure-sensitive adhesive becomes low, and an increase in pressure-sensitive adhesive force, occurring when being heated, may be deteriorated.

[Acrylic Polymer]

Hereinafter, an acrylic polymer, which is a preferred specific example of the polymer (A), will be described in detail.

An acrylic polymer is a polymer containing, as a monomer unit, 50% by mass or more of a (meth)acrylic acid alkyl ester having, for example, a $C_{1-20}$ linear or branched alkyl group. Additionally, the acrylic polymer may have a structure formed by only a (meth)acrylic acid alkyl ester having a $C_{1-20}$ alkyl group or by a combination of two or more thereof. A method of obtaining the acrylic polymer is not particularly limited, and the polymer can be obtained by applying various polymerization methods that are generally used as a method of synthesizing an acrylic polymer, such as solution polymerization, emulsion polymerization, block polymerization, suspension polymerization, and radiation curing polymerization.

The ratio of the (meth)acrylic acid alkyl ester having a $C_{1-20}$ linear or branched alkyl group to the total mass of the monomer components for preparing the acrylic polymer is 50% by mass to 99.9% by mass, preferably 60% by mass to 98% by mass, and more preferably 70% by mass to 95% by mass.

Examples of the (meth)acrylic acid alkyl ester having a $C_{1-20}$ linear or branched alkyl group include, for example: (meth)acrylic acid $C_{1-20}$ alkyl esters [preferably (meth)acrylic acid $C_{2-14}$ alkyl esters, more preferably (meth)acrylic acid $C_{2-10}$ alkyl esters, and particularly preferably (meth)acrylic acid $C_{6-10}$ alkyl esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid isooctadecyl, (meth)acrylic acid nonadecyl, and (meth)acrylic acid eicosyl; and the like. Herein, the (meth)acrylic acid alkyl ester means an acrylic acid alkyl ester and/or a methacrylic acid alkyl ester, and all of the "(meth) . . . " have the same meaning.

The acrylic polymer may contain another monomer component (copolymerizable monomer) that is copolymerizable with the (meth)acrylic acid alkyl ester, if necessary, in order to improve cohesive force, heat resistance, and a bridging characteristic, etc. Accordingly, the acrylic polymer may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxyethyl acrylate, carboxypentyl acrylate, itaconic acid, maleic acid, fumaric acid, crotonic acid, and isocrotonic acid; hydroxyl group-containing monomers including (meth)acrylic acid hydroxyalkyls, such as (meth)acrylic acid 2-hydroxyethyl, (meth)acrylic acid 2-hydroxypropyl, (meth)acrylic acid 2-hydroxybutyl, (meth)acrylic acid 3-hydroxypropyl, (meth)acrylic acid 4-hydroxybutyl, (meth)acrylic acid 6-hydroxyhexyl, (meth)acrylic acid 8-hydroxyoctyl, (meth)acrylic acid 10-hydroxydecyl, (meth)acrylic acid 12-hydroxy lauryl, and (4-hydroxymethyl cyclohexyl)methyl methacrylate; acid anhydride group-containing monomers, such as maleic acid anhydride and itaconic acid anhydride; sulfonic group-containing monomers, such as styrenesulfonic acid, allylsulfonic acid, 2-(meth)acrylamide 2-methylpropanesulfonic acid, (meth)acrylamide propanesulfonic acid, sulfopropyl (meth)acrylate, and (meth)acryloyloxy naphthalenesulfonic acid; phosphate group-containing monomers, such as 2-hydroxyethyl acryloyl phosphate; (N-substituted)amide monomers, such as (meth)acrylamide, N,N-dialkyl(meth)acrylamides including N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl)(meth)acrylamide, etc., N-ethyl(meth)acrylamide, N-isopropyl(meth)acrylamide, N-butyl(meth)acrylamide, N-n-butyl(meth)acrylamide, N-methylol(meth)acrylamide, N-ethylol(meth)acrylamide, N-methylol propane(meth)acrylamide, N-methoxymethyl (meth)acrylamide, N-methoxyethyl(meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; vinyl esters, such as vinyl acetate and vinyl propionate; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloyl pyrrolidine, N-vinyl morpholine, N-vinyl-2-piperidone, N-vinyl-3-morpholinone, N-vinyl-2-caprolactam, N-vinyl-1,3-oxazine-2-one, N-vinyl-3,5-morpholinedione, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyano-containing monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; styrene monomers, such as styrene and α-methylstyrene; epoxy group-containing acrylic monomers, such as (meth)acrylic acid glycidyl; acrylic acid ester monomers having a heterocycle, halogen atom, silicon atom, or the like, such as (meth)acrylic acid tetrahydrofurfuryl, fluorine atom-containing (meth)acrylate, and silicone (meth)acrylate; olefin monomers, such as isoprene, butadiene, and isobutylene; vinyl ether monomers, such as methyl vinyl ether and ethyl vinyl ether; vinyl esters, such as vinyl acetate and vinyl propionate; aromatic vinyl compounds, such as vinyl toluene and styrene; olefins or dienes, such as ethylene, butadiene, isoprene, and isobutylene; vinyl ethers, such as vinyl alkyl ether; vinyl chloride; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl (meth)acrylate; acryloyl morpholine; (meth)acrylic acid esters having an alicyclic hydrocarbon group, such as cyclopentyl(meth)acrylate, cyclohexyl(meth)acrylate, isobornyl (meth)acrylate, and dicyclopentanyl(meth)acrylate; (meth)acrylic acid esters having an aromatic hydrocarbon group, such as phenyl(meth)acrylate, and phenoxyethyl(meth)acrylate; (meth)acrylic acid esters obtained from terpene compound derivative alcohols; and the like. These copolymerizable monomers can be used alone or in combination of two or more thereof.

By containing 0.01% by mass or more of the copolymerizable monomer, the cohesive force of the pressure-sensitive adhesive sheet having a pressure-sensitive adhesive layer formed by the acrylic pressure-sensitive adhesive composition can be prevented from being decreased. Further, by containing 40% by mass or less of the copolymerizable monomer, the cohesive force thereof can be prevented from being too high, and the tackiness at normal temperature (25° C.) can be improved.

Additionally, the acrylic polymer may contain, if necessary, a polyfunctional monomer for adjusting the cohesive force of the pressure-sensitive adhesive composition to be formed.

Examples of the polyfunctional monomer include, for example, (poly)ethylene glycol di(meth)acrylate, (poly)propylene glycol di(meth)acrylate, neopentyl glycol di(meth) acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth) acrylate, 1,12-dodecanediol di(meth)acrylate, trimethylolpropane tri(meth)acrylate, tetramethylolmethan tri(meth)acrylate, allyl(meth)acrylate, vinyl(meth)acrylate, divinylbenzene, epoxy acrylate, polyester acrylate, urethane acrylate, butyldiol (meth)acrylate, hexyldiol (meth)acrylate, and the like. Among them, trimethylolpropane tri (meth) acrylate, hexanediol di(meth)acrylate, and dipentaerythritol hexa(meth)acrylate can be preferably used. The polyfunctional monomers can be used alone or in combination of two or more thereof.

The use amount of the polyfunctional monomer is changed depending on the molecular weight or the number of functional groups thereof, but the polyfunctional monomer is added in an amount of 0.01% by mass to 3.0% by mass, preferably 0.02% by mass to 2.0% by mass, and more preferably 0.03% by mass to 1.0% by mass, based on the total mass of the monomer components for preparing the acrylic polymer.

If the use amount of the polyfunctional monomer is more than 3.0% by mass based on the total mass of the monomer components for preparing the acrylic polymer, for example, the cohesive force of a pressure-sensitive adhesive composition may become too high, and the effect of suppressing the initial pressure-sensitive adhesive force may be deteriorated. Conversely, if the use amount of the polyfunctional monomer is less than 0.01% by mass, for example, the cohesive force of a pressure-sensitive adhesive composition is decreased, and an increase in the pressure-sensitive adhesive force, occurring when being heated, may be insufficient.

In preparing the acrylic polymer, it can be easily formed by a curing reaction using heat or ultraviolet rays with the use of a polymerization initiator, such as a thermal polymerization initiator, photo-polymerization initiator (photo-initiator), or the like. The polymerization initiators can be used alone or in combination of two or more thereof.

Examples of the thermal polymerization initiator include, for example, azo polymerization initiators (e.g., 2,2'-azobisisobutyronitrile, 2,2'-azobis-2-methylbutyronitrile, 2,2'-azobis(2-methylpropionic acid)dimethyl, cyanovalerianic acid, azobis isovaleronitrile, 2,2'-azobis(2-amidinopropane) dihydrochloride, 2,2'-azobis[2-(5-methyl-2-imidazoline-2-yl) propane]dihydrochloride, 2,2'-azobis(2-methylpropionamidine)disulfate, and 2,2'-azobis (N,N'-dimethyleneisobutylamidine)dihydrochloride, etc.); peroxide polymerization initiators (e.g., dibenzoyl peroxide, t-butyl permaleate, and lauroyl peroxide, etc.); redox polymerization initiators; and the like.

The use amount of the thermal polymerization initiator is not particularly limited, but it is blended, for example, in an amount within a range of 0.01 parts by mass to 5 parts by mass, and preferably within a range of 0.05 parts by mass to 3 parts by mass, based on 100 parts by mass of the monomer components for preparing the acrylic polymer.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specifically, examples of the benzoin ether photo-polymerization initiator include, for example, benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by BASF], anisoin, and the like. Examples of the acetophenone photo-polymerization initiator include, for example, 1-hydroxycyclohexyl phenyl ketone [product name: IRGACURE 184, made by BASF], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by BASF], 2-hydroxy-2-methyl-1-phenyl-propane-1-one [product name: DAROCUR 1173, made by BASF], methoxy acetophenone, and the like. Examples of the α-ketol photo polymerization initiator include, for example, 2-methyl-2-hydroxy propiophenone, 1-[4-(2-hydroxyethyl)-phenyl]-2-hydroxy-2-methylpropane-1-one, and the like. Examples of the aromatic sulfonyl chloride photo-polymerization initiator include, for example, 2-naphthalene sulfonyl chloride, and the like. Examples of the photoactive oxime photo-polymerization initiator include, for example, 1-phenyl-1,2-propanedione-2-(o-ethoxycarbonyl)-oxime, and the like.

Examples of the benzoin photo-polymerization initiator include, for example, benzoin, and the like. Examples of the benzyl photo-polymerization initiator include, for example, benzyl, and the like. Examples of the benzophenone photo-polymerization initiators include, for example, benzophenone, benzoylbenzoic acid, 3,3'-dimethyl-4-methoxybenzophenone, polyvinyl benzophenone, α-hydroxy cyclohexyl phenyl ketone, and the like. Examples of the ketal photo-polymerization initiator include, for example, benzyl dimethyl ketal, and the like. Examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, dodecyl thioxanthone, and the like.

Examples of the acylphosphine photo-polymerization initiator include, for example: bis(2,6-dimethoxybenzoyl)phenylphosphine oxide, bis(2,6-dimethoxvbenzoyl)(2,4,4-trimethylpentyl) phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octviphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl) phosphine oxide, bis(2,6-diethoxybenzoyl)(1-methylpropane-1-yl) phosphine oxide, bis(2,6-dibutoxybenzoyl)(2-methylpropane-1-yl) phosphine oxide, bis(2,4- dimethoxybenzoyl)(2-methypropane-1-yl) phosphineoxide, bis(2,4,6-trimethylbenzoyl)(2,4-dipentoxyphenyl) phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxvbenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, and the like.

The use amount of the photo-polymerization initiator is not particularly limited, but it is blended, for example, in an amount within a range of 0.01 parts by mass to 5 parts by mass, and preferably within a range of 0.05 parts by mass to 3 parts by mass, based on 100 parts by mass of the monomer components for preparing the acrylic polymer.

If the use amount of the photo-polymerization initiator is less than 0.01 parts by mass, a polymerization reaction may become insufficient. If the use amount thereof is more than 5 parts by mass, an ultraviolet ray may not reach the inside of the pressure-sensitive adhesive layer, because the photo-polymerization initiator absorbs an ultraviolet ray. In this case, a rate of polymerization is decreased, or the molecular weight of the generated polymer becomes small. Thereby, the cohesive force of the formed pressure-sensitive adhesive layer is decreased, and an increase in the pressure-sensitive adhesive force, occurring when being heated, may become insufficient. The photo-polymerization initiators can be used alone or in combination of two or more thereof.

In the present embodiment, the polymer (A) can also be prepared as a partial polymer (acrylic polymer syrup) whose monomer components are partially polymerized by irradiating a mixture, in which the monomer components and the polymerization initiator have been blended, with ultraviolet (UV) rays. The polymerization of the acrylic polymer syrup can be completed by blending the later-described polymer (B) into the syrup to prepare a pressure-sensitive adhesive composition and then by coating the pressure-sensitive adhesive composition on a predetermined object to be coated followed by irradiation with ultraviolet rays. That is, the acrylic polymer syrup is a precursor of the polymer (A), and accordingly a composition, in which the polymer (B) is blended into the acrylic polymer syrup, also corresponds to the pressure-sensitive adhesive composition according to the present embodiment.

[(Meth)acrylic Polymer (B)]

The (meth)acrylic polymer (B) (hereinafter, arbitrarily referred to as a "polymer (B)") is characterized in that the weight average molecular weight is 10000 or more but less than 50000. The (meth)acrylic polymer preferably contains, as a monomer unit, a monomer having a polyorganosiloxane backbone.

A monomer (B1) having a polyorganosiloxane backbone that forms the polymer (B) is not particularly limited, and any polyorganosiloxane backbone-containing monomer can be used. Uneven distribution of the polymer (B) to the surface of an adherend is actively promoted by the low polarity of the polyorganosiloxane backbone-containing monomer, the low polarity being derived from the structure of the monomer, thereby exhibiting easy peelability at the beginning of attachment.

As a specific example of the polyorganosiloxane backbone-containing monomer, for example, a polyorganosiloxane backbone-containing monomer represented by the following general formula (1) or (2) can be used. More specifically, examples of one-terminal reactive silicone oil made by Shin-Etsu Chemical Co., Ltd., include X-22-174ASX, X-22-2426, X-22-2475, KF-2012, and the like, which can be used alone or in combination of two or more thereof.

[Chemical Formula 3]

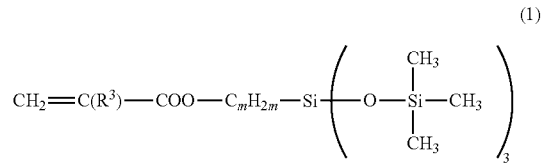

(1)

[Chemical Formula 4]

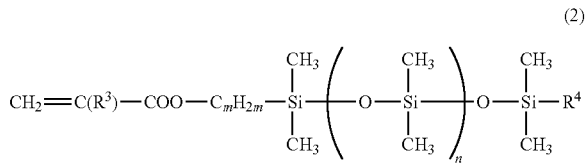

(2)

[in the formulae (1) and (2), $R^3$ is hydrogen or methyl, $R^4$ is methyl or a monovalent organic group, and m and n are integers of 0 or larger.]

The functional group equivalent weight of the monomer (B1) having a polyorganosiloxane backbone, which forms the polymer (B), is preferably 700 g/mol or more but less than 15000 g/mol, more preferably 800 g/mol or more but less than 10000 g/mol, still more preferably 850 g/mol or more but less than 6000 g/mol, and particularly preferably 1500 g/mol or more but less than 5000 q/mol. When the functional group equivalent weight of the monomer (B1) having a polyorganosiloxane backbone is within the above range, the compatibility is moderately reduced, and hence the polymer is stabilized at room temperature with a small increase in pressure-sensitive adhesive force, and is excellent in the property of increasing the pressure-sensitive adhesive force, when being heated. If the functional group equivalent weight of the monomer (B1) having a polyorganosiloxane backbone is less than 700 g/mol, easy peelability is not exhibited, and pressure-sensitive adhesive force may not be reduced at the beginning of attachment. Conversely, if the functional group equivalent weight of the monomer having a polyorganosiloxane backbone is 15000 g/mol or more, the compatibility with the polymer (A) is remarkably deteriorated, and pressure-sensitive adhesive force may not be reduced at the beginning of the attachment to an adherend, or the property of increasing the pressure-sensitive adhesive force, when being heated, may be deteriorated.

Herein, the "functional group equivalent weight" means the mass of a main backbone (e.g., polydimethylsiloxane) bound to one functional group. The indicated unit of g/mol is obtained by converting into 1 mol of functional groups. The functional group equivalent weight of a monomer having a polyorganosiloxane backbone is calculated from spectral intensities of $^1$H-NMR (proton NMR) obtained, for example, by a nuclear magnetic resonance (NMR) measuring apparatus.

In $^1$H-NMR, the ratio of the spectral intensity of H bound to the silicon in a siloxane structure via C (e.g., H in Si—$(CH_3)_2$) to the spectral intensity of H in a functional group (C—$CH_3$, SH, or C=$CH_2$) is calculated.

When an example is described in which the case where the ratio of the spectral intensity of H in Si—$(CH_3)_2$, which is a siloxane structure, to the spectral intensity ratio of H in C=$CH_2$, which is a functional group, is calculated, the ratio of the number of Si—$(CH_3)_2$, which is a siloxane structure, to the number of C=$CH_7$, which is a functional group, the Si—$(CH_3)_2$ and C=$CH_7$ being contained in a measurement sample, is known from the spectral intensity ratio.

Because the chemical formulae of the siloxane structure and the functional group are known in advance, the ratio (A/B) of the number (A) of siloxane structures each having an Si—$(CH_3)_2$ bonding to the number (B) of the functional groups, the siloxane structures and the functional groups being contained in the measurement sample, is known from the ratio of the number of Si—$(CH_3)_2$, which is the siloxane structure, and the number of C=$CH_2$, which is the functional group.

Because the molecular weight per one siloxane structure having an Si—$(CH_3)_2$ bond (herein, dimethylsiloxane) is known, the value obtained by multiplying the molecular weight per one siloxane structure with the ratio (A/B) of the number A of the siloxane structures to the number of the functional groups, becomes the mass of the siloxane structure having an Si—$(CH_3)_2$ nand per one functional group, i.e., the mass of the main backbone, and the value obtained by multiplying the mass thereof with the Avogadro's number becomes the functional group equivalent weight (g/mol).

When two or more types of monomers each having a polyorganosiloxane backbone, the functional group equivalent weights of which are different from each other, are used, the arithmetic mean value of the functional group equivalent weights can be used as the functional group equivalent weight of the monomers. That is, the functional group equivalent weight can be calculated from the following equation: The functional group equivalent weight of a monomer mixture (g/mol)=(the functional group equivalent weight of monomer 1×the blending amount thereof+the functional group equivalent weight of monomer 2×the blending amount thereof+the functional group equivalent weight of monomer n×the blending amount thereof)/(the blending amount of monomer 1+the blending amount of monomer 2+ . . . +the blending amount of monomer n)

The content of the monomer (B1) having a polyorganosiloxane backbone, having a functional group equivalent weight of 700 g/mol or more but less than 15000 g/mol, is 5% by mass or more but 50% by mass or less, preferably 10% by mass or more but 40% by mass or less, and more preferably 15% by mass or more but 30% by mass or less, based on the mass of the total monomer components of the polymer (B). If the content is less than 5% by mass, pressure-sensitive adhesive force may not be reduced at the beginning of attachment. Conversely, when the content is more than 50% by mass, the property of increasing the pressure-sensitive adhesive force, when being heated, may be deteriorated.

The polymer (B) may be a copolymer with, other than the monomer having a polyorganosiloxane backbone, one or more monomers selected from the group consisting of a (meth)acrylic monomer, monomer having a polyoxyalkylene backbone, (meth)acrylic acid ester monomer, and copolymerizable monomer.

Examples of such a (meth)acrylic acid ester monomer include: (meth)acrylic acid $C_{1-20}$ alkyl esters [preferably (meth)acrylic acid $C_{1-10}$ alkyl esters, more preferably (meth)acrylic acid $C_{1-6}$ alkyl esters, and particularly preferably (meth)acrylic acid $C_{2-6}$ alkyl-esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; (meth)acrylic acid esters each having an alicyclic hydrocarbon group, such as (meth)acrylic acid dicyclopentanyl, (meth)acrylic acid isobornyl, and (meth)acrylic acid 1-adamantyl; (meth)acrylic acid aryl esters, such as (meth)acrylic acid phenyl and (meth)acrylic acid benzyl; (meth)acrylic acid esters obtained from terpene compound derivative alcohols; amide group-containing vinyl monomers, such as acryloyl morpholine, dimethylacrylamide, diethylacrylamide, dimethylaminopropylacrylamide, isopropylacrylamide, and hydroxyethyl acrylamide; lactam monomers, such as N-vinylcaprolactams including N-vinyl-2-caprolactam, and the like; and the like. Such (meth)acrylic acid ester monomers can be used alone or in combination of two or more thereof. It is particularly preferable to use methyl methacrylate and/or butyl methacrylate. The content of the (meth)acrylic acid ester monomer is preferably 10% by mass or more but 95% by mass or less, more preferably 20% by mass or more but 90% by mass or less, and still more preferably 30% by mass or more but 85% by mass or less, based on the mass of the total monomer components of the polymer (B).

The polymer (B) can also be obtained by copolymerizing, other than the (meth)acrylic acid ester component unit, another monomer component (copolymerizable monomer) copolymerizable with the (meth)acrylic acid ester. For example, a functional group that is reactive with an epoxy group or an isocyanate group may be introduced into the polymer (B). Examples of such a functional group include a hydroxyl group, carboxyl group, amino group, amide group, and mercapto group, and a monomer having such a functional group may be used (copolymerized) in producing the polymer (B).

Examples of the another monomer that is copolymerizable with the (meth)acrylic acid ester include: carboxyl group-containing monomers, such as acrylic acid, methacrylic acid, carboxvethyl acrylate, carboxypentyl acrylate, itaconic acid, maleic acid, fumaric acid, crotonic acid, and isocrotonic acid; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth) acrylic acid ester monomers of (poly)oxyalkylene, such as di(meth)acrylic acid ester of ethylene glycol, di(meth) acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth) acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth) acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, and adducts between lactones and (meth)acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl (meth)acrylamide, N-butyl(meth)acrylamide, N,N-diethyl (meth)acrylamide, N,N-dimethyl(meth)acrylamide, N-methylol(meth)acrylamide, N-ethylol(meth)acrylamide, N-methylolpropane(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth) acryloyl-6-oxy hexamethylene succinimide, and N-(meth) acryloyl-8-oxy hexamethylene succinimide; maleimide monomers, such as N-cyclohexyl maleimide, N-isopropyl-maleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N vinylpyridine, N-vinylpiperidone, N-vinylpyrimidine, N-vinylpiperazine, N-vinylpyrrole, N-vinylimidazole, N-vinyloxazole, N-(meth)acryloyl-2-pyrrolidone, N-(meth)acryloylpiperidine, N-(meth) acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyanoacrylate monomers, such as meth)acrylonitrile; (meth)acrylic acid aminoalkyl monomers, such as (meth)acrylic acid aminoethyl, (meth)acrylic acid N,N-dimethylaminoethyl, (meth) acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxy-prophyltrimethoxysilane, allyltrimethoxysilane, trimethoxysilylpropylallylamine, 2-methoxyethoxytrimethoxysilane; hydroxyl group-containing monomers, such as (meth) acrylic acid hydroxyalkyls including (meth)acrylic acid hydroxyethyl, (meth)acrylic acid hydroxypropyl, (meth) acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl (4-hydroxymethyl cyclohexyl)methyl methacrylate, and the like; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macromonomers having a radically polymerizable vinyl group at the monomer end to which a vinyl group has been polymerized, etc. These monomers can be copolymerized, alone or in combination thereof, with the (meth)acrylic acid esters.

The weight average molecular weight of the polymer (B) is 10000 or more but less than 50000, preferably 12000 or more but less than 50000, more preferably 15000 or more but less than 40000, and still more preferably 20000 or more but less than 40000. When the weight average molecular weight of the polymer (B) is within the above range, compatibility is moderately reduced, and hence the polymer is stabilized at room temperature with a small increase in pressure-sensitive adhesive force, and is excellent in the property of increasing the pressure-sensitive adhesive force, when being heated. If the weight average molecular weight of the polymer (B) is 50000 or more, the pressure-sensitive adhesive force, occurring at the beginning of attachment, is not reduced. Conversely, if the weight average molecular weight thereof is less than 10000, the molecular weight becomes low, and hence the pressure-sensitive adhesive force of a pressure-sensitive adhesive sheet may not be increased when being heated.

The weight average molecular weights of the polymer (A) and the polymer (B) can be determined by a gel permeation chromatography (GPC) method and by polystyrene conversion. Specifically, they are measured in accordance with the method and conditions described in the later-described Examples.

The polymer (B) can be produced by polymerizing the above monomer with the use, for example, of a solution polymerization method, bulk polymerization method, emulsion polymerization method, suspension polymerization, block polymerization, or the like.

In order to adjust the molecular weight of the polymer (B), a chain transfer agent can be used during the polymerization. Examples of the chain transfer agent to be used include: compounds having a mercapto group, such as octylmercaptan, laurylmercaptan, t-nonyl mercaptan, t-dodecyl mercaptan, mercaptoethanol, and α-thioglycerol; thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, and thioglycolic acid esters including thioglycolic acid ester of ethylene glycol, thioglycolic acid ester of neopentyl glycol, and thioglycolic acid ester of pentaerythritol; α-methylstyrene dimer; and the like.

The use amount of the chain transfer agent is not particularly limited, but is contained in an amount of usually 0.05 parts by mass to 20 parts by mass, preferably 0.1 parts by mass to 15 parts by mass, and more preferably 0.2 parts by mass to 10 parts by mass, based on 100 parts by mass of the monomer. By thus adjusting the addition amount of the chain transfer agent, the (meth)acrylic polymer (B) having a preferred molecular weight can be obtained. The chain transfer agents can be used alone or in combination of two or more thereof.

[Pressure-Sensitive Adhesive Composition]

The pressure-sensitive adhesive composition contains the above polymer (A) and polymer (B) as essential components. The content of the polymer (B) is 0.1 parts by mass or more but 20 parts by mass or less, preferably 0.3 parts by mass to 17 parts by mass, more preferably 0.4 parts by mass to 15 parts by mass, and still more preferably 0.5 parts by mass to 12 parts by mass, based on 100 parts by mass of the polymer (A). If the polymer (B) is added in an amount more than 20 parts by mass, the pressure-sensitive adhesive force of a pressure-sensitive adhesive layer formed by the pressure-sensitive adhesive composition according to the present embodiment is decreased after being heated. Conversely, if the addition amount of the polymer (B) is less than 0.1 parts by mass, the effect of suppressing the pressure-sensitive adhesive force, occurring when attached to an adherend, is small, and a failure may occur, in which rework cannot be performed.

The pressure-sensitive adhesive composition may contain, other than the above polymer (A) and polymer (B), various types of additives that are common in the field of pressure-sensitive adhesive compositions, as optional components. Such optional components are exemplified by a tackifying resin, cross-linking agent, catal t, plasticizer, softener, filler, colorant (pigment, dye, or the like), antioxidant, leveling agent, stabilizer, antiseptic, antistatic agent, and the like. Such additives that are conventionally and publicly known can be used by ordinary methods.

In order to adjust the cohesive force of the later-described pressure-sensitive adhesive layer, cross-linking agent cam also be used other than the above various monomers. Normally-used cross-linking agents can be used as the cross-linking agent, and examples thereof include, for example, an epoxy cross-linking agent, isocyanate cross-linking agent, silicone cross-linking agent, oxazoline cross-linking agent, aziridine cross-linking agent, silane cross-linking agent, alkyl-etherified melamine cross-linking agent, metal chelate cross linking agent, and the like. In particular, an isocyanate cross-linking agent, epoxy cross-linking agent, and metal chelate cross-linking agent can be preferably used. These compounds may be used alone or in combination of two or more thereof.

Specific examples of the isocyanate cross-linking agent include: tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate, polymethylene polyphenyl isocyanate, and these adducts with polyols, such as trimethylolpropane. Alternatively, a compound having, in one molecule, at least one isocyanate group and one or more unsaturated bonds, specifically 2-isocyanate ethyl(meth) acrylate, etc., can also be used as the isocyanate cross-linking agent. These compounds may be used alone or in combination of two or more thereof.

Examples of the epoxy cross-linking agent include, bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, 1,3-his(N,N-diglycidyl aminomethyl) cyclohexane, and the like. These compounds may be used alone or in combination of two or more thereof.

Examples of the metal chelate compound include: as metal components, aluminum, iron, tin, titanium, nickel, and the like; and as chelate components, acetylene, methyl acetoacetate, ethyl lactate, and the like. These compounds may be used alone or in combination of two or more thereof.

The cross-linking agent is preferably contained in an amount of 0.01 parts by mass to 15 parts by mass, and more preferably contained in an amount of 0.5 parts by mass to 10 parts by mass, based on 100 parts by mass of the polymer (A). If the content thereof is less than 0.01 parts by mass, the cohesive force of a pressure-sensitive adhesive composition may become small, and hence adhesion reliability may be deteriorated. Conversely, if the content is more than 15 parts by mass, the cohesive force of a pressure-sensitive adhesive composition is large and the flowability thereof is deteriorated, and an increase in pressure-sensitive adhesive force, occurring when being heated, may be deteriorated.

The pressure-sensitive adhesive composition disclosed herein may further include a cross-linking catalyst for further effectively promoting any one of the above cross-linking reactions. As such a cross-linking catalyst, for example, a tin catalyst (in particular, dioctyl tin dilaurate) can be preferably used. The use amount of the cross-linking catalyst (e.g., a tin catalyst such as dioctyl tin dilaurate) is not particularly limited, but the use amount may be, for example, approximately 0.0001 parts by mass to 1 part by mass, based on 100 parts by mass of the polymer (A).

The tackifying resin is not particularly limited, and examples thereof include, for example, a rosin tackifying resin, terpene tackifying resin, phenol tackifying resin, hydrocarbon tackifying resin, ketone tackifying resin, polyamide tackifying resin, epoxy tackifying resin, elastomer tackifying resin, and the like.

Examples of the rosin tackifying resin include, for example: unmodified rosin (raw rosin), such as gum rosin, wood rosin, and tall oil rosin; modified rosins obtained by modifying these unmodified rosins with polymerization, disproportionation, and hydrogenation, etc., (polymerized rosin, stabilized rosin, disproportionated rosin, completely hydrogenated rosin, partially hydrogenated rosin, and other chemically modified rosin, etc.); and various rosin derivatives. Examples of the rosin derivatives include, for example: rosin phenol resins obtained by adding phenol to rosins (unmodified rosin, modified rosin, and various rosin derivatives, etc.) with an acid catalyst followed by being subjected to thermal polymerization; rosin ester resins, such as rosin ester compounds (unmodified rosin esters) obtained by esterifying unmodified rosin with alcohols, and modified rosin ester compounds (such as polymerized rosin ester, stabilized rosin ester, disproportionated rosin ester, completely hydrogenated rosin ester, and partially hydrogenated rosin ester) obtained by esterifying modified rosin (such as polymerized rosin, stabilized rosin, disproportionated rosin, completely hydrogenated rosin, and partially hydrogenated rosin) with alcohols; unsaturated fatty acid-modified rosin resins obtained by modifying unmodified rosin or modified rosins (polymerized rosin, stabilized rosin, disproportionated rosin, completely hydrogenated rosin, and partially hydrogenated rosin, etc.) with an unsaturated fatty acid; unsaturated fatty acid-modified rosin ester resins obtained by modifying rosin ester resins with an unsaturated fatty acid; rosin alcohol resins obtained by subjecting carboxyl groups in unmodified rosin, modified rosin (polymerized rosin, stabilized rosin, disproportionated rosin, completely hydrogenated rosin, and partially hydrogenated rosin, etc.), unsaturated fatty acid-modified rosin resins, or unsaturated fatty acid-modified rosin esters to a reduction treatment; metal salts of rosin resins (in particular, rosin ester resins), such as unmodified rosin, modified rosin, and various rosin derivatives; and the like.

Examples of the terpene tackifying resin include, for example: terpene resins, such as an α-pinene polymer, β-pinene polymer, and dipentene polymer; modified terpene resins obtained by modifying (phenol modification, aromatic modification, hydrogenation modification, and hydrocarbon modification, etc.) these terpene resins (e.g., a terpene phenol resin, styrene modified terpene resin, aromatic modified terpene resin, and hydrogenated terpene resin, etc.); and the like.

Examples of the phenol tackifying resin include, for example: condensates of various phenols (e.g., phenol, m-cresol, 3,5-xylenol, p-alkylphenol, and resorcinol, etc.) and formaldehydes (e.g., an alkylphenol resin and xylene-formaldehyde resin, etc.); resols obtained by subjecting the phenols and the formaldehydes to an addition reaction with an alkali catalyst; novolacs obtained by subjecting the phenols and the formaldehydes to a condensation reaction with an acid catalyst; and the like.

Examples of the hydrocarbon tackifying resin (petroleum tackifying resin) include, for example: aliphatic hydrocarbon resins [polymers of aliphatic hydrocarbons, such as $C_{4-5}$ olefins and dienes (olefins such as butene-1, isobutylene, and pentene-1; and dienes such as butadiene, 1,3-pentadiene, and isoprene)]; aliphatic cyclic hydrocarbon resins [alicyclic hydrocarbon resins obtained by subjecting a so-called "C4 petroleum fraction" or "C5 petroleum fraction" to cyclization/dimerization followed by being subjected to polymerization; polymers of cyclic diene compounds (cyclopentadiene, dicyclopentadiene, ethylidene norbornene, and dipentene, etc.) or hydrogenated compounds thereof; and alicyclic hydrocarbon resins obtained by hydrogenating the aromatic ring of the following aromatic hydrocarbon resins and aliphatic and aromatic petroleum resins]; aromatic hydrocarbon resins [polymers of $C_{8-10}$ vinyl group-containing aromatic hydrocarbons (styrene, vinyl toluene, α-methylstyrene, indene, and methylindene, etc.)]; aliphatic and aromatic petroleum resins (styrene-olefin copolymers, etc.); aliphatic and alicyclic petroleum resins; hydrogenated hydrocarbon resins; cumarone resins; cumarone indene resins; and the like.

Commercially available products of the polymerized rosin ester that can be preferably used are exemplified by the products with the names of "PENSEL D-125", "PENSEL D-135", "PENSEL D-160", "PENBEL KK", and "PENSEL C", etc., which are all made by ARAKAWA CHEMICAL INDUSTRIES, LTD., but, are not limited thereto.

Commercially available products of the terpene phenol resin that can be preferably used are exemplified by the products: with the names of "YS Polystar S-145" "YS Polystar G-125", "YS Polystar N125", "YS Polystar U-115", which are made by YASUHARA CHEMICAL CO., LTD.; with the names of TAMANOL 803L" and "TAMANOL 901", which are made by ARAKAWA CHEMICAL INDUSTRIES, LTD.; with the name of "SUMILITE RESIN PR-12603" made by SUMITOMO BAKELITE CO., LTD.; and the like, but are not limited thereto.

[Pressure-Sensitive Adhesive Layer and Pressure-Sensitive Adhesive Sheet]

Subsequently, the structure of a pressure-sensitive adhesive sheet, having a pressure-sensitive adhesive layer Including a pressure-sensitive adhesive composition having the above composition, will be described.

The pressure-sensitive adhesive layer can be a layer in which a pressure-sensitive adhesive composition has been cured. That is, the pressure-sensitive adhesive layer can be formed by providing the pressure-sensitive adhesive composition to an appropriate supporting body (e.g., application or coating) and then by properly performing a curing treatment. When two or more types of curing treatments (drying, cross-linking, polymerization, etc.) are performed, these treatments can be performed simultaneously or in multiple stages. In the case of the pressure-sensitive adhesive composition using a partial polymer (acrylic polymer syrup), a final copolymerization reaction is typically performed as the curing treatment (the partial polymer is subjected to a further copolymerization reaction to form a complete polymer). For example, when a photo-curable pressure-sensitive adhesive composition is used, light irradiation is performed. A curing treatment, such as cross-linking, drying, or the like, may be performed, if necessary. For example, when a photo-curing pressure-sensitive adhesive composition is required to be dried, it is good to perform light curing after drying. In the case of a pressure-sensitive adhesive composition using a complete polymer, a treatment, such as drying (drying by heating) or cross-linking, is typically performed as the curing treatment, if necessary.

The application or coating of the pressure-sensitive adhesive composition can be performed by using a commonly-used coater, such as, for example, a gravure roll coater, reverse roll coater, kiss-roll coater, dip roll coater, bar coater, knife coater, or spray coater. Alternatively, the pressure-sensitive adhesive layer may be formed by directly providing the pressure-sensitive adhesive composition to a supporting body, or the pressure-sensitive adhesive layer formed on a release liner may be transferred to a supporting body.

It is desirable that the solvent-insoluble component ratio of the pressure-sensitive adhesive layer is 20.0% by mass to 99.0% by mass, and preferably 30.0% by mass to 90.0% by mass. If the solvent-insoluble component ratio is less than 20.0% by mass, cohesive force becomes insufficient, and adhesion reliability may be deteriorated; conversely, if the solvent-insoluble component ratio is more than 99.0% by mass, cohesive force becomes too large, and an increase in pressure-sensitive adhesive force, occurring when being heated, may become insufficient. An evaluation method of the solvent-insoluble component ratio will be described later.

The thickness of the pressure-sensitive adhesive layer is not particularly limited, and is, for example, normally 3 μm to 200 μm, and preferably 5 μm to 150 μm, thereby allowing good adhesiveness to be achieved. If the thickness of the pressure-sensitive adhesive layer is less than 3 μm, an increase in the pressure-sensitive adhesive force, occurring when being heated, may be deteriorated; conversely, if the thickness thereof is more than 200 μm, the effect of suppressing the pressure-sensitive adhesive force occurring immediately after attachment, may become insufficient.

FIG. 1 is a side view of a pressure-sensitive adhesive sheet 10 according to the present embodiment. The pressure-sensitive adhesive sheet 10 illustrated in FIG. 1 includes a substrate 12 and a pressure-sensitive adhesive layer 14 that is laminated on one side of the substrate 12 and is made of a pressure-sensitive adhesive composition. In the pressure-sensitive adhesive sheet 10, such a pressure-sensitive adhesive layer is fixedly provided on at least one surface of the substrate 12, i.e., without the intention of separating the pressure-sensitive adhesive layer 14 from the substrate 12. The concept of the pressure-sensitive adhesive sheet described herein can involve objects referred to as a pressure-sensitive adhesive tape, a pressure-sensitive adhesive film, a pressure-sensitive adhesive label, and the like. The pressure-sensitive adhesive sheet may be one cut or punched into an appropriate shape in accordance with its purpose of use. The pressure-sensitive adhesive layer is not limited to a continuously-formed layer, but may be a pressure-sensitive adhesive layer formed into a regular or random pattern, such as, for example, a dot-shaped pattern or a stripe-shaped pattern.

Examples of the above supporting body (substrate) include, for example: plastic films, such as polyolefin films including polyethylene, polypropylene, poly-1-butene, poly-4-methyl-1-pentene, ethylene propylene copolymer, ethylene 1-butene copolymer, ethylene vinyl acetate copolymer, ethylene ethyl acrylate copolymer, and ethylene vinyl alcohol copolymer, polyester films including polyethylene terephthalate, polyethylene naphthalate, and polybutylene terephthalate, polyacrylate film, polystyrene film, polyamide films including nylon 6, nylon 6, 6, and partially aromatic polyamide, polyvinylchloride film, polyvinylidene chloride film, and polycarbonate film; foam substrates, such as a polyurethane foam, and polyethylene foam; paper, such as craft paper, crepe paper, and Japanese paper; cloth, such as cotton cloth and staple fiber cloth; nonwoven cloth, such as polyester nonwoven cloth and vinylon nonwoven cloth; metallic foils, such as aluminum foil and copper foil; and the like, which can be appropriately selected and used in accordance with the use of the pressure-sensitive adhesive tape.

The supporting body can also be subjected to, if necessary: a mold release and antifouling treatment using a c release agent, such as a silicone release agent, fluorine release agent, long-chain alkyl release agent, or fatty acid amide release agent, or silica powders; and an easy-adhesion treatment, such as an acid treatment, alkali treatment, primer treatment, corona treatment, plasma treatment, ultraviolet treatment, or the like. The thickness of the supporting body can be appropriately selected in accordance with its purpose, but is generally within a range of approximately 5 µm to 200 µm (typically within a range of 10 µm to 100 µm).

The supporting body can also subjected to, if necessary: a mold release and antifouling treatment using a release agent, such as a silicone release agent, fluorine release agent, long-chain alkyl release agent, or fatty acid amide release agent, or silica powders; an easy-adhesion treatment, such as an acid treatment, alkali treatment, primer treatment, corona treatment, plasma treatment, ultraviolet treatment, or the like; and an antistatic treatment, such as a coating type, kneading type, vapor deposition type, or the like.

In order to protect the pressure-sensitive adhesive surface, a release liner can be attached, if necessary, to the surface of the pressure-sensitive adhesive layer in the pressure-sensitive adhesive sheet of the present embodiment.

Paper or a plastic film can be used as a material for forming the release liner, but a plastic film is preferably used because it is excellent in surface smoothness. The film is not particularly limited, as far as the film can protect the pressure-sensitive adhesive layer, and examples of the film include, for example: a polyethylene film, polypropylene film, polybutene film, polybutadiene film, polymethylpentene film, polyvinylchloride film, vinylchloride copolymer film, polyethylene terephthalate film, polybutylene terephthalate film, polyurethane film, ethylene-vinylacetate copolymer film, and the like.

The thickness of the release liner is usually within a range of 5 µm to 200 µm, and preferably within a range of approximately 10 µm to 100 µm. When the thickness Is within the range, the liner is excellent in workability for the attachment to the pressure-sensitive adhesive layer and workability for the release from the pressure-sensitive adhesive layer, and hence it is preferable. The above release liner may be subjected, if necessary, to: a mold release and antifouling treatment using a release agent, such as a silicone release agent, fluorine release agent, long-chain alkyl release agent, or fatty acid amide release agent, or silica powders; and an antistatic treatment, such as a coating type, kneading type, vapor deposition type, or the like.

In the pressure-sensitive adhesive sheet according to the present embodiment, the pressure-sensitive adhesive force, occurring immediately after the sheet is attached to an adherend, is small and rework can be performed, and further the pressure-sensitive adhesive force is not much increased at room temperature even over time. Accordingly, even in a state where a period of time (e.g., several minutes to several days), which is long to some extent, has passed since the pressure-sensitive adhesive sheet was attached to an adherend, rework can be performed. That is, the pressure-sensitive adhesive sheet according to the embodiment can easily deal with not only the reattachment to be performed immediately after being attached to an adherend, but also the reattachment required for inspection, or the like, after being left for a long time in the state of being attached to an adherend. Accordingly, the pressure-sensitive adhesive sheet according to the embodiment can be applied to various steps and uses in which periods of time when left in the state of being attached to an adherend are different from each other. Further, the sheet can be reattached over a long period of time, and hence manufacturing yield can be improved.

Furthermore, the pressure-sensitive adhesive sheet according to the present embodiment can increase the pressure-sensitive adhesive force several times to several tens times by being heated, although the pressure-sensitive adhesive force is small over a long period of time in the state of room temperature (e.g., 23° C., 50% RH) before being heated, and hence the sheet has the property that adhesion reliability is high. A common thermosetting tape is required to be heated at 50 to 200° C. for approximately 30 seconds to 5 hours. On the other hand, the heating temperature of the pressure-sensitive adhesive sheet according to the embodiment is, for example, lower than 150° C., preferably 100° C. or lower, and more preferably 80° C. or lower. The heating time thereof is, for example, less than 1 hour, preferably 30 minutes or less, more preferably 1.0 minutes or less, and still more preferably 5 minutes or less.

The pressure-sensitive adhesive force of a pressure-sensitive adhesive sheet, occurring immediately after being attached (after 30 minutes at room temperature), can be evaluated by a 180°-peeling pressure-sensitive adhesive force test in which the sheet is peeled at tensile speed of 300 mm/min and at a peel angle of 180°. The pressure-sensitive adhesive force thereof, occurring over time or after being heated, can also be evaluated in the above 180°-peeling pressure-sensitive adhesive force test performed under the same conditions. The 180°-peeling pressure-sensitive adhesive force test is performed in accordance with the method and conditions described in the later-described Examples.

The pressure-sensitive adhesive force of the pressure-sensitive adhesive sheet according to the present embodiment is small to an extent in which rework can be performed, over a long period of time from the beginning of attachment, and hence the sheet can be stored for a long period of time. On the other hand, the sheet is firmly attached to an adherend by being heated at a desired timing, and hence in a manufacturing method of an electronic apparatus including the step of attaching a pressure-sensitive adhesive sheet to an adherend, the flexibility of handling the pressure-sensitive adhesive sheet is increased. The sheet can be preferably used: as a joint member for parts in mobile apparatuses and other electrical and electronic equipment, etc.; or as a joint member: for various parts in automobiles and home electronic appliances, etc., other than in optical applications in which optical films to be used in image display apparatuses, such as liquid crystal displays, plasma displays, and organic EL displays, are adhered. Alternatively, the pressure-sensitive adhesive sheet according to the embodiment may use the above optical film as a substrate.

EXAMPLES

Hereinafter, examples of the present invention will be described, but these examples are merely exemplary for explaining the invention preferably, and should not limit the invention in any way.
(Preparation of (Meth)acrylic Polymer 1 (2EHA/AA=95/5) as (A) Component)

Ninety-five parts by mass of 2-ethylhexyl acrylate (2EHA), 5 parts by mass of acrylic acid (AA), and 200 parts by mass of ethyl acetate as a polymerization solvent were placed into a 4-neck flask provided with a stirring blade, a thermometer, a nitrogen gas inlet pipe, and a cooler. After they were stirred under a nitrogen atmosphere at 60° C. for 2 hours, 0.2 parts by mass of azobisisobutyronitrile were placed therein as a thermal polymerization initiator to react with them at 60° C. for 6 hours. The weight average molecular weight of the obtained polymer was 1,100,000.
(Preparation of (Meth)acrylic Polymer 2 (2EHA/AA=94/6) as (A) Component)

Ninety four parts by mass of 2-ethylhexyl acrylate (2EHA), 6 parts by mass of acrylic acid (AA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup) having a polymerization rate of approximately 8% by mass was obtained by exposing the mixture to ultraviolet rays under a nitrogen atmosphere to be partially photopolymerized.
(Preparation of (Meth)acrylic Polymer 3 (2EHA/BA/AA/4HBA=30/67/3/0.05) as (A) Component)

Twenty nine parts by mass of 2-ethylhexyl acrylate (2EHA), 68 parts by mass of butyl acrylate (BA), 3 parts by mass of acrylic acid (AA), 0.05 parts by mass of 4-hydroxy butyl acrylate, and 150 parts by mass of toluene as a polymerization solvent, were placed into a 4-neck flask provided with a stirring blade, a thermometer, a nitrogen gas inlet pipe, and a cooler. After they were stirred under a nitrogen atmosphere at 60° C. for 2 hours, 0.1 parts by mass of azobisisobutyronitrile were placed therein as a thermal polymerization initiator to react with them at 60° C. for 6 hours. The weight average molecular weight of the obtained polymer was 450,000.
(Preparation of (Meth)acrylic Polymer 4 (2EHA/HEA=96/4) as (A) Component)

Ninety six parts by mass of 2-ethylhexyl acrylate (2EHA), 4 parts by mass of hydroxyethyl acrylate (HEA), and 150 parts by mass of ethyl acetate as a polymerization solvent were placed into a 4-neck flask provided with a stirring blade, a thermometer, a nitrogen gas inlet pipe, and a cooler. After they were stirred under a nitrogen atmosphere at 60° C. for 2 hours, 0.2 parts by mass of azobisisobutyronitrile were placed therein as a thermal polymerization initiator to react with them at 60° C. for 6 hours. The weight average molecular weight of the obtained polymer was 550,000.
(Preparation of (Meth)acrylic Polymer 1 (MMA/BMA/2EHMA/X-22-174ASX/KF-2012=40/20/20/8.7/11.3) as (B) Component)

One hundred parts by mass of toluene, 40 parts by mass of methyl (meth)acrylates (MMA), 20 parts by mass of butyl (meth)acrylates (BMA), 20 parts by mass of 2-ethylhexyl (meth)acrylates (2-EHMA), 8.7 parts by mass of polyorganosiloxane backbone-containing (meth)acrylate monomer having a functional group equivalent, weight of 900 g/mol (product name: X-22-174ASX, made by Shin-Etsu. Chemical Co., Ltd.), 11.3 parts by mass of polyorganosiloxane backbone-containing (meth)acrylate monomer having a functional group equivalent weight of 4600 g/mol (product name: KF-2012, made by Shin-Etsu Chemical Co., Ltd.), and 0.51 parts by mass of methyl thioglycolate as a chain transfer agent were placed into a 4-neck flask provided with a stirring blade, a thermometer, a nitrogen gas inlet pipe, a cooler, and a dropping funnel. The mixture was stirred under a nitrogen atmosphere at 70° C. for 1 hour, and 0.2 parts by mass of azobisisobutyronitriles as a thermal polymerization initiator were then placed therein to react the mixture at 70° C. for 2 hours, and thereafter 0.1 parts by mass of azobisisobutyronitrile were placed therein as a thermal polymerization initiator, so that they were subsequently reacted together at 80° C. for 5 hours. The weight average molecular weight of the obtained (meth)acrylic polymer 1 was 20000.
((Meth)acrylic Polymer as Another (B) Component)

Each of the (meth)acrylic polymers 2 and 3 was produced in the same way as in the (meth)acrylic polymer 1, except that the monomer compositions, the type of solvent, and the parts by mass of the chain transfer agent were added in the way listed in Table 1.

TABLE 1

| No. | Composition | Copolymerization Ratio | Functional Group Equivalent Weight | Mw |
|---|---|---|---|---|
| (Meth)acrylic Polymer 1 | MMA/BMA/2EHMA/X22-174ASX/KF-2012 | 40/20/20/8.7/11.3 | 2990 | 22000 |
| (Meth)acrylic Polymer 2 | MMA/BMA/2EHMA/KF-2012 | 40/20/20/20 | 4600 | 36000 |
| (Meth)acrylic Polymer 3 | MMA/BMA/X22-174ASX/KF-2012 | 40/40/8.7/11.3 | 2990 | 21000 |

The abbreviations described in Table 1 are as follows.

MMA: Methyl Methacrylate, 105° C.

BMA: Butyl Methacrylate, Tg 20° C.

2EHMA: 2-Ethylhexyl Methacrylate, Tg −10° C.

X-22-174ASX: Polyorganosiloxane backbone-containing methacrylate monomer, functional group equivalent weight is 900 g/mol, made by Shin-Etsu Chemical Co., Ltd.

KF-2012: Polyorganosiloxane backbone-containing methacrylate monomer, functional group equivalent weight is 4600 g/mol, made by Shin-Etsu Chemical Co., Ltd.

Measurement of Molecular Weight

The weight average molecular weight of a polymer was measured by using a GPC apparatus (HLG-8220GPC, made by TOSOH CORP.). Measurement conditions were as follows and the molecular weight was determined by standard polystyrene conversion.

Sample Concentration: 0.2 wt % (Tetrahydrofuran (THF) solution)
Sample Injection volume: 10 μl
Eluent: THF
Flow Rate: 0.6 ml/min
Measuring Temperature: 40° C.
Column:
  Sample Column; TSKguardcolumn SuperHZ-H (one column)+TSKgel SuperHZM-H (two columns)
  Reference Column; TSKgel SuperH-RC (one column)
Detector: Refractive Index Detector (RI)

Example 1

(Preparation of Pressure-Sensitive Adhesive Composition)

After 7 parts by mass of the above (meth)acrylic polymer 1 and 3 parts by mass of CORONATE L as a cross-linking agent were added to 100 parts by mass of the above (meth)acrylic polymer 1, they were mixed uniformly to prepare a pressure-sensitive adhesive composition (1).

(Production of Pressure-Sensitive Adhesive Sheet)

The above pressure-sensitive adhesive composition (1) was coated on the release-treated surface of a polyester film (product name: Diafoil MRF, made by Mitsubishi Plastics Inc.), and heated at 110° C. for 2 minutes to form a pressure-sensitive adhesive layer having a thickness of 20 μm. Subsequently, a polyethylene terephthalate film having a thickness of 25 μm was attached to the surface of the above pressure-sensitive adhesive layer, thereby producing a pressure-sensitive adhesive sheet.

Examples 2 to 5 and 7, Comparative Examples 1 to 3

Each of the pressure-sensitive adhesive sheets of Examples 2-5, and 7 was produced in the same way as in Example 1 by preparing a pressure-sensitive adhesive composition in the same way as in Example 1, except that 100 parts by mass of the polymer (A) listed in Table 2, the polymer (B) listed in Table 1, the tackifying resin, and the cross-linking agent, which are listed in Table 2, were used at blend ratios listed in Table 2. Each of the pressure-sensitive adhesive sheets of Comparative Examples 1 to 3 was produced in the same way as in Example 1 by preparing a pressure-sensitive adhesive composition in the same way as in Example 1, except that the polymer (A) listed in Table 2 was used.

Example 6

(Production of Pressure-Sensitive Adhesive Layer)

After 5 parts by mass of the (meth)acrylic polymer 2 and 0.1 parts by mass of TMPTA were added to 100 parts by mass of the (meth)acrylic polymer 2, they were mixed uniformly to obtain a pressure-sensitive adhesive composition.

(Production of Pressure-Sensitive Adhesive Sheet)

A coated layer having a final thickness of 50 μm was formed by coating the above pressure-sensitive adhesive composition on one surface of a polyester film having a thickness of 38 μm (product name: Diafoil MRF, made by Mitsubishi Plastics Inc.), the one surface having been subjected to a release treatment with silicone. Subsequently, the surface of the coated pressure-sensitive adhesive composition was covered with one surface of a polyester film having a thickness of 38 μm (product name: Diafoil MRE, made by Mitsubishi Plastics Inc.), the one surface having been subjected to a release treatment with silicone, so that the one surface of the film was located near to the coated layer. Thereby, oxygen was blocked from the coated layer of the pressure-sensitive adhesive composition (pressure-sensitive adhesive composition layer). The coated layer thus obtained was irradiated for 360 seconds with ultraviolet rays having an illuminance of 5 mW/cm$^2$ (measures by TOPCON UVR-T1 having maximum sensitivity at approximately 350 nm) by using a chemical light lamp (made by TOSHIBA CORPORATION) in order to be polymerized, thereby allowing a pressure-sensitive adhesive layer sheet to be obtained. Thereafter, the polyester film on one side was peeled, and a polyethylene terephthalate film having a thickness of 25 μm was attached, thereby producing a pressure-sensitive adhesive sheet.

TABLE 2

|  | Polymer (A) 100 Parts by Mass | Polymer (B) Type | Polymer (B) Parts by Mass | Tackifying Resin Type | Tackifying Resin Parts by Mass | Cross-linking Agent Type | Cross-linking Agent Parts by Mass | Gel Fraction (%) |
|---|---|---|---|---|---|---|---|---|
| Example 1 | 2EHA/AA = 95/5 | (Meth)acrylic Polymer 1 | 7 | — | — | CORONATE L | 3 | 39.9 |
| Example 2 | 2EHA/AA = 95/5 | (Meth)acrylic Polymer 1 | 5 | PENSEL D125 | 20 | CORONATE L | 2 | 24.3 |
| Example 3 | 2EHA/AA = 95/5 | (Meth)acrylic Polymer 3 | 5 | — | — | CORONATE L | 1 | 40.6 |
| Example 4 | 2EHA/AA = 95/5 | (Meth)acrylic Polymer 2 | 5 | TAMANOL 803L | 20 | CORONATE L | 1 | 31.0 |
| Example 5 | 2EHA/AA = 95/5 | (Meth)acrylic Polymer 1 | 5 | PENSEL D125/ YS Polystar | 10/10 | CORONATE L | 3 | 37.7 |
| Example 6 | 2EHA/AA = 94/6 | (Meth)acrylic Polymer 2 | 5 | — | — | TMPTA | 0.1 | 79.9 |
| Example 7 | 2EHA/BA/AA/4HBA = 30/67/3/0.05 | (Meth)acrylic Polymer 1 | 10 | PENSEL D125 | 30 | CORONATE L | 3 | 33.7 |
| Comparative Example 1 | 2EHA/HEA = 96/4 | — | — | — | — | CORONATE L | 3 | 95.0 |

TABLE 2-continued

|  | Polymer (A) 100 Parts by Mass | Polymer (B) Type | Polymer (B) Parts by Mass | Tackifying Resin Type | Tackifying Resin Parts by Mass | Cross-linking Agent Type | Cross-linking Agent Parts by Mass | Gel Fraction (%) |
|---|---|---|---|---|---|---|---|---|
| Comparative Example 2 | 2EHA/BA/AA/4HBA = 30/67/3/0.05 | — | — | — | — | CORONATE L | 3 | 32.0 |
| Comparative Example 3 | 2EHA/AA = 95/5 | — | — | — | — | CORONATE L | 1 | 40.2 |

(Measurement of Solvent-Insoluble Component Ratio)

A solvent-insoluble component ratio (gel fraction) was calculated in the following way: after 0.1 g of a pressure-sensitive adhesive composition was sampled and precisely weighed (mass before dipping), the sampled composition was dipped in approximately 50 ml of ethyl acetate at room temperature (20 to 25° C.) for 1 week; a solvent (ethyl acetate) insoluble component was taken out to be dried at 130° C. for 2 hours and then weighed (mass after dipping and drying); and the ratio was calculated by using an equation for calculating a solvent-insoluble component ratio of "solvent-insoluble component ratio (% by mass)=[(mass after dipping and drying)/(mass before dipping)]×100". The measurement results of the solvent-insoluble component ratios are shown in Table 2.

(Test Method)
[Constant Load Peeling]

A piece obtained by cutting each of the pressure-sensitive adhesive sheets of the respective Examples and Comparative Examples into a size of 10 mm in width×60 mm in length was used as a test specimen. An ABS plate having a thickness of 2.0 mm (product name: ABS-N-WN) cleaned with isopropyl alcohol was provided. The release liner (polyester film) on the other side of the pressure-sensitive adhesive sheet was peeled, and the pressure-sensitive adhesive surface thereof was attached to the ABS plate by reciprocating a 2-kg roller once.

Thereafter, a heat treatment was performed at 80° C. for minutes and then left under the environment of 23° C.×50% RH for 30 minutes, and then a constant load (150 g) was fixed to one end of the pressure-sensitive adhesive sheet 10. The peeling of the tape sample was started under a constant load such that a peel angle was 90°. Assuming that a 10-mm length of the tape sample was to remain, a period of time, until the remaining length of 50 mm was all peeled, was measured. The measurement was performed under the environment of 23° C.×50% RH. In the present embodiment, the case where the load did not fall after 3 hours from the start of the measurement was evaluated as good (○), while the case it fell was evaluated as NG (×). The measurement results of the constant load peeling are shown in Table 3.

[180°-Peeling Pressure-Sensitive Adhesive Force Test]

A piece obtained by cutting each of the pressure-sensitive adhesive sheets of the respective Examples and Comparative Examples into a width of 20 mm was used as a test specimen. Additionally, an ABS plate having a thickness of 2.0 mm, cleaned with isopropyl alcohol, and a SUS plate (430 BA plate) cleaned with toluene were provided. Then, the release liner (polyester film) on the other side of the pressure-sensitive adhesive sheet was peeled, and the pressure-sensitive adhesive surface of the sheet was attached to each of the ABS plate and the SUS plate (430 BA plate) by reciprocating a 2-kg roller.

After the pressure-sensitive adhesive sheet was attached to the ABS plate or the SUS plate (430 BA plate), it was left under the environment of 23° C. for 30 minutes (initial condition). Additionally, after the pressure-sensitive adhesive sheet was attached to the ABS plate or the SUS plate (430 BA plate), it was left under the environment of 23° C. for 24 hours. Additionally, after the pressure-sensitive adhesive sheet was attached to the ABS plate or the SUS plate (430 BA plate), it was subjected to a heat treatment at 80° C. for 5 minutes, and thereafter it was left under the environment of 23° C. for 30 minutes (after being heated). The other end of each of the pressure-sensitive adhesive sheets of the initial condition, after 24 hours, and after being heated, was peeled at tensile speed of 300 mm/min and in a direction in which a peel angle was 180°, and the pressure-sensitive adhesive force (resistance force) (unit: N/20 mm) to an adherend, occurring at the time, was measured.

In the ABS plate, the case where the pressure-sensitive adhesive force, occurring under the initial condition, was 1.0 or less, that occurring after 24 hours was 2.5 or less, and that occurring after being heated was 6.5 or more was evaluated as good (○); while the pressure-sensitive adhesive force, occurring under the initial condition, was more than 1.0, that occurring after 24 hours was more than 2.5, and that occurring after being heated at 80° C. for 5 minutes was less than 6.5 was evaluated as NG (×). In the SUS plate (430 BA plate), the case where the pressure-sensitive adhesive force occurring under the initial condition, was 1.5 or less, that occurring after 24 hours was 3.5 or less, and that occurring after being heated at 80° C. for 5 minutes was 6.0 or more was evaluated as good (○); while the pressure-sensitive adhesive force, occurring under the initial condition, was more than 1.5, that occurring after 24 hours was more than 3.5, and that occurring after being heated was less than 6.0 was evaluated as NG (×). The measurement results of 180°-peeling pressure-sensitive adhesive force are shown in Table 3.

[Reworkability Evaluation]

A piece obtained by cutting each of the pressure-sensitive adhesive sheets of the respective Examples and Comparative Examples into a size of 20 mm in width×50 mm in length was used as a test specimen. The release liner (polyester film) on the other side of the pressure-sensitive adhesive sheet was peeled, and the pressure-sensitive adhesive surface thereof was attached to a glass plate having a thickness of 1.0 mm, cleaned with isopropyl alcohol, by reciprocating a 2-kg roller once. Thereafter, it was left under the environment of 23° C.×50% RH for 24 hours, and then it was evaluated whether the pressure-sensitive adhesive sheet was able to be peeled. The case where the sheet was able to be peeled easily was evaluated as good (○), and the case where the sheet was not able to be peeled and the adherend was destroyed was evaluated as NG (×). The results of the reworkability evaluation are shown in Table 3.

For the measurement of shear storage modulus described below in Examples other than Example 6, a piece obtained by coating a pressure-sensitive adhesive to a polyester film and then attaching the polyester film to a pressure-sensitive adhesive layer was used. In Example 6, the pressure-sensitive adhesive sheet prior to the attachment of a polyethylene terephthalate was used.

[Measurement of Shear Storage Modulus]

A shear storage modulus was determined by dynamic viscoelasticity measurement. A laminated body (laminated pressure-sensitive adhesive layer) having a thickness of approximately 1.5 mm was produced by laminating pressure-sensitive adhesive sheets, which was used as a measurement sample. A shear storage modulus was calculated by measuring the measurement sample with a dynamic viscoelasticity measuring apparatus (apparatus name: "ARES", made by TA Instruments, Inc.) under the conditions in which a frequency was 1 Hz a heating rate was 5° C./min within a temperature range of −20 to 100° C. The measurement results of the shear storage moduli of the pressure-sensitive adhesive sheets of the respective Examples and Comparative Examples, measured at 23° C. before and after the heating at 80° C. for 5 minutes, are shown in Table 3.

for 5 minutes, are within a range of $7.4 \times 10^4$ to $1.4 \times 10^5$ Pa. The rate of change of the shear storage modulus between before and after the heating at 80° C. for 5 minutes is 1.0 to 1.3 times.

The shear storage moduli at 23° C. and after the heating at 80° C. for 5 minutes of the above pressure-sensitive adhesive layer, which are measured as a function of shear strain at a frequency of 1 Hz by dynamic viscoelasticity measurement, is preferably $1.0 \times 10^4$ to $1.0 \times 10^6$ Pa, more preferably $2.0 \times 10^4$ to $6.0 \times 10^5$ Pa, and still more preferably $5.0 \times 10$ to $3.0 \times 10^5$ Pa. The rate of change of shear storage moduli between before and after the heating at 80° C. for 5 minutes is preferably 2.0 times or less, more preferably 1.0 to 2.0 times, and still more preferably 1.0 to 1.8 times, particularly preferably 1.0 to 1.5 times, and most preferably 1.0 to 1.3 times. Thereby, even when the pressure-sensitive adhesive sheet is attached to a rough surface, desired pressure-sensitive adhesiveness can be achieved. Further, even when the pressure-sensitive adhesive force of the pressure-sensitive adhesive layer is increased by heating, the pressure-sensitive adhesive layer does not become much hard, and hence desired drop impact resistance can be achieved.

TABLE 3

| | Pressure-Sensitive Adhesive Force To ABS (N/20 mm) | | | | Pressure-Sensitive Adhesive Force To SUS (430 BA) (N/20 mm) | | | |
|---|---|---|---|---|---|---|---|---|
| | After 30 Minutes at 23° C. | After 24 Hours at 23° C. | 80° C. × 5 minutes → After 30 Minutes at 23° C. | Evaluation | After 30 Minutes at 23° C. | After 24 Hours at 23° C. | 80° C. × 5 minutes → After 30 Minutes at 23° C. | Evaluation |
| Example 1 | 0.02 | 0.08 | 6.90 | ○ | 0.03 | 0.06 | 8.75 | ○ |
| Example 2 | 0.62 | 1.85 | 11.15 | ○ | 0.31 | 0.61 | 11.60 | ○ |
| Example 3 | 0.10 | 0.30 | 10.10 | ○ | 0.04 | 0.10 | 6.98 | ○ |
| Example 4 | 0.13 | 0.21 | 9.20 | ○ | 0.10 | 0.13 | 10.40 | ○ |
| Example 5 | 0.68 | 1.80 | 11.73 | ○ | 0.20 | 0.40 | 9.80 | ○ |
| Example 6 | 0.84 | 2.24 | 7.81 | ○ | 1.20 | 3.04 | 6.25 | ○ |
| Example 7 | 0.40 | 2.32 | 10.20 | ○ | 0.40 | 2.40 | 9.27 | ○ |
| Comparative Example 1 | 0.27 | 0.29 | 0.13 | x | 0.15 | 0.16 | 0.15 | x |
| Comparative Example 2 | 10.12 | 11.32 | 13.00 | x | 10.16 | 11.32 | 11.00 | x |
| Comparative Example 3 | 8.08 | 8.44 | 9.25 | x | 8.08 | 8.00 | 7.50 | x |

| | Reworkability After 24 Hours at 23° C. | Constant Load Peeling | | Shear Storage Modulus of Pressure-Sensitive Adhesive, occurring before and after Heating at 80° C. for 5 minutes, G'[Pa], 23° C. | | |
|---|---|---|---|---|---|---|
| | | Gap (mm) | Evaluation | Before Heating (G1) | After Heating (G2) | Rate of Change G2/G1 |
| Example 1 | ○ | 4.5 | ○ | 9.0.E+04 | 9.1.E+04 | 1.0 |
| Example 2 | ○ | 2.8 | ○ | 1.1.E+05 | 1.1.E+05 | 1.0 |
| Example 3 | ○ | 8.8 | ○ | 7.4.E+04 | 8.6.E+04 | 1.2 |
| Example 4 | ○ | 5.0 | ○ | 8.8.E+04 | 1.1.E+05 | 1.3 |
| Example 5 | ○ | 2.5 | ○ | 1.2.E+05 | 1.3.E+05 | 1.1 |
| Example 6 | ○ | 37.0 | ○ | 9.3.E+04 | 9.3.E+04 | 1.0 |
| Example 7 | ○ | 17.0 | ○ | 1.2.E+05 | 1.4.E+05 | 1.1 |
| Comparative Example 1 | ○ | Fall | x | 2.3.E+05 | 2.3.E+05 | 1.0 |
| Comparative Example 2 | x | 9.3 | ○ | 1.0.E+05 | 1.6.E+05 | 1.6 |
| Comparative Example 3 | x | Fall | x | 6.9.E+04 | 1.1.E+05 | 1.6 |

As shown in Table 3, all of the shear storage moduli of the pressure-sensitive adhesive layers of the respective Examples, occurring before and after the heating at 80° C.

It can be considered that the pressure-sensitive adhesive sheet according to the present embodiment exhibits the above properties because of the following reasons. The polydimethylsiloxane backbone of the (meth)acrylic polymer (B) forms a weak adhesive interface with an adherend at the beginning of attachment, which reduces the initial pressure-sensitive adhesive force can be considered that the pressure-sensitive adhesive force is gradually increased with the polydimethylsiloxane chain of the (meth)acrylic polymer (B) moving away from the interface over time. It can also be considered that when being heated, the polydimethylsiloxane chain that has received external energy is more likely to move, and with moving away from the interface, the pressure-sensitive adhesive force is greatly increased. Further, the (meth)acrylic polymer (B) has good compatibility with the polymer (A) because of having a (meth)acrylic backbone, and hence the polymer (B) does not contaminate (is not transferred to) an adherend after being peeled.

Furthermore, the pressure-sensitive adhesive sheet according to the present embodiment may be produced by using an acid less acrylic polymer. In this case, a pressure-sensitive adhesive sheet in which failures (metallic corrosion, etc.) resulting from an acid monomer are reduced can be achieved.

In the pressure-sensitive adhesive sheet according to the present embodiment, strong pressure-sensitive adhesive force can be obtained by heating it at relatively low temperature of approximately 80° C. and for a short period of time (several minutes), as described above. Further, in the pressure-sensitive adhesive sheet according to the embodiment, the shear storage modulus of the pressure-sensitive adhesive layer is not greatly changed between before and after heating, and hence even when an adherend to which the pressure-sensitive adhesive sheet is attached is dropped, peeling, which may be caused by a break of a pressure-sensitive adhesive layer, is less likely to be caused and drop impact resistance is improved.

The present invention should not be limited to the above embodiments, and various modifications, such as design modifications, can be made with respect to the above embodiments based on the knowledge of those skilled in the art, and an embodiment with such a modification can fall within the scope of the invention.

The invention claimed is:
1. A pressure-sensitive adhesive sheet comprising:
   a substrate; and
   a pressure-sensitive adhesive layer laminated on at least one side of the substrate, wherein
   the pressure-sensitive adhesive layer contains:
   100 parts by mass a polymer A having a glass transition temperature lower than 0° C., and
   0.5 to 15 parts by mass of a (meth)acrylic polymer having a weight average molecular weight of 10000 or more but less than 40000,
   the (meth)acrylic polymer contains, as a monomer unit, a monomer having a polyorganosiloxane backbone,
   a content of the monomer having a polyorganosiloxane backbone is 5% by mass or more but 50% by mass or less based on a mass of the total monomer components that form the (meth)acrylic polymer,
   the pressure-sensitive adhesive layer further contains at least one cross-linking agent selected from the group consisting of an isocyanate cross-linking agent, an epoxy cross-linking agent, and a metal chelate cross-linking agent in an amount of 0.5 parts by mass to 10 parts by mass based on 100 parts by mass of the polymer A; or monomer components forming the acrylic polymer A contains a polyfunctional monomer in an amount of 0.03% by mass to 1.0% by mass based on the total mass of the monomer components,
   pressure-sensitive adhesive force, occurring after 30 minutes since the pressure-sensitive adhesive layer was attached to an ABS plate, is 1.0 [N/20 mm] or less,
   pressure-sensitive adhesive force, occurring after 24 hours since the pressure-sensitive adhesive layer was attached to an ABS plate, is 2.5 [N/20 mm] or less, and
   pressure-sensitive adhesive force, occurring after 30 minutes at 23° C. since the pressure-sensitive adhesive layer was attached to an ABS plate and then heated at 80° C. for 5 minutes, is 6.5 [N/20 mm] or more.

2. The pressure-sensitive adhesive sheet according to claim 1, wherein the monomer having a polyorganosiloxane backbone is a polyorganosiloxane group-containing monomer having a functional group equivalent weight of 700 g/mol or more but less than 15000 g/mol, which is represented by the following general formula (1) or (2):

[Chemical Formula 1]

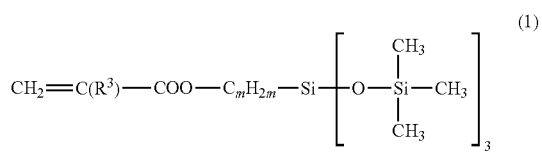

[Chemical Formula 2]

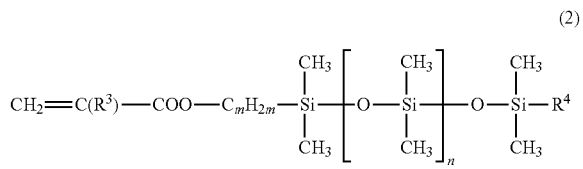

[in the formulae (1) and (2), $R^3$ is hydrogen or methyl, $R^4$ is methyl or a monovalent organic group, and m and n are integers of 0 or larger].

3. The pressure-sensitive adhesive sheet according to claim 2, wherein the functional group equivalent weight of the polyorganosiloxane group-containing monomer is 1500 g/mol or more but less than 5000 g/mol.

4. The pressure-sensitive adhesive sheet according to claim 1, wherein a shear storage modulus of the pressure-sensitive adhesive layer after heating at 80° C. for 5 minutes is G2 and a shear storage modulus of the pressure-sensitive adhesive before heating at 80° C. for 5 minutes is G1, and G2/G1 is 2.0 or less.

5. The pressure-sensitive adhesive sheet according to claim 1, wherein a shear storage modulus of the pressure-sensitive adhesive layer after heating at 80° C. for 5 minutes is G2 and a shear storage modulus of the pressure-sensitive adhesive before heating at 80° C. for 5 minutes is G1, and G2/G1 is 1.0 to 1.3.

6. The pressure-sensitive adhesive sheet according to claim 1, wherein the polymer A having a glass transition temperature lower than 0° C. contains, as a monomer unit, 50% by mass or more of a (meth)acrylic acid alkyl ester having a $C_{1-20}$ linear or branched alkyl group.

7. The pressure-sensitive adhesive sheet according to claim 1, wherein the polymer A contains, as a monomer unit, 50% by mass or more of a (meth)acrylic acid alkyl ester having a $C_{6-10}$ linear or branched alkyl group.

8. The pressure-sensitive adhesive sheet according to claim 1, wherein the weight average molecular weight of the (meth)acrylic polymer is 15000 or more but less than 40000.

9. The pressure-sensitive adhesive sheet according to claim 1, wherein the (meth)acrylic polymer is a copolymer of the monomer having a polyorganosiloxane backbone and a (meth)acrylic acid ester monomer.

10. The pressure-sensitive adhesive sheet according to claim 9, wherein the (meth)acrylic acid ester monomer that forms the (meth)acrylic polymer is a (meth)acrylic acid $C_{1-6}$ alkyl ester.

11. The pressure-sensitive adhesive sheet according to claim 9, wherein a content of the (meth)acrylic acid ester monomer is 10% by mass or more but 95% by mass or less based on a mass of the total monomer components that form the (meth)acrylic polymer.

12. A pressure-sensitive adhesive sheet comprising:
a substrate; and
a pressure-sensitive adhesive layer laminated on at least one side of the substrate, wherein
the pressure-sensitive adhesive layer contains:
100 parts by mass of a polymer A having a glass transition temperature lower than 0° C., and
0.5 parts by mass to 15 parts by mass of a (meth)acrylic polymer having a weight average molecular weight of 10000 or more but less than 40000,
the (meth)acrylic polymer contains, as a monomer unit, a monomer having a polyorganosiloxane backbone and a (meth)acrylic acid ester monomer,
a content of the monomer having a polyorganosiloxane backbone is 5% by mass or more but 50% by mass or less based on a mass of the total monomer components that form the (meth)acrylic polymer,
the pressure-sensitive adhesive layer further contains at least one cross-linking agent selected from the group consisting of an isocyanate cross-linking agent, an epoxy cross-linking agent, and a metal chelate cross-linking agent in an amount of 0.5 parts by mass to 10 parts by mass based on 100 parts by mass of the polymer A; or monomer components forming the acrylic polymer A contains a polyfunctional monomer in an amount of 0.03% by mass to 1.0% by mass based on the total mass of the monomer components,
pressure-sensitive adhesive force, occurring after 30 minutes since the pressure-sensitive adhesive layer was attached to an ABS plate, is 1.0 [N/20 mm] or less,
pressure-sensitive adhesive force, occurring after 24 hours since the pressure-sensitive adhesive layer was attached to an ABS plate, is 2.5 [N/20 mm] or less, and
pressure-sensitive adhesive force, occurring after 30 minutes at 23° C. since the pressure sensitive adhesive layer was attached to an ABS plate and then heated at 80° C. for 5 minutes, is 6.5 [N/20 mm] or more.

13. A pressure-sensitive adhesive sheet according to claim 12, wherein the (meth)acrylic acid ester monomer comprises one or more monomers selected form the group consisting of methyl methacrylate, ethyl methacrylate and methacrylic acid ester having an alicyclic hydrocarbon group.

14. A pressure-sensitive adhesive sheet comprising:
a substrate; and
a pressure-sensitive adhesive layer laminated on at least one side of the substrate, wherein
the pressure-sensitive adhesive layer contains:
100 parts by mass of a polymer A having a glass transition temperature lower than 0° C., and
0.5 to 15 parts by mass of a (meth)acrylic polymer having a weight average molecular weight of 10000 or more but less than 40000,
the (meth)acrylic polymer contains, as a monomer unit, a monomer having a polyorganosiloxane backbone and a (meth)acrylic acid ester monomer comprising one or more monomers selected form the group consisting of methyl methacrylate, ethyl methacrylate and methacrylic acid ester having an alicyclic hydrocarbon group,
a content of the monomer having a polyorganosiloxane backbone is 5% by mass or more but 50% by mass or less based on a mass of the total monomer components that form the (meth)acrylic polymer,
the pressure-sensitive adhesive layer further contains at least one cross-linking agent selected from the group consisting of an isocyanate cross-linking agent, an epoxy cross-linking agent, and a metal chelate cross-linking agent in an amount of 0.5 parts by mass to 10 parts by mass based on 100 parts by mass of the polymer A; or monomer components forming the acrylic polymer A contains a polyfunctional monomer in an amount of 0.03% by mass to 1.0% by mass based on the total mass of the monomer components;
pressure-sensitive adhesive force, occurring after 30 minutes since the pressure-sensitive adhesive layer was attached to an ABS plate, is 1.0 [N/20 mm] or less,
pressure-sensitive adhesive force, occurring after 24 hours since the pressure-sensitive adhesive layer was attached to an ABS plate, is 2.5 [N/20 mm] or less, and
pressure-sensitive adhesive force, occurring after 30 minutes at 23° C. since the pressure sensitive adhesive layer was attached to an ABS plate and then heated at 80° C. for 5 minutes, is 6.5 [N/20 mm] or more.

* * * * *